UNITED STATES PATENT OFFICE.

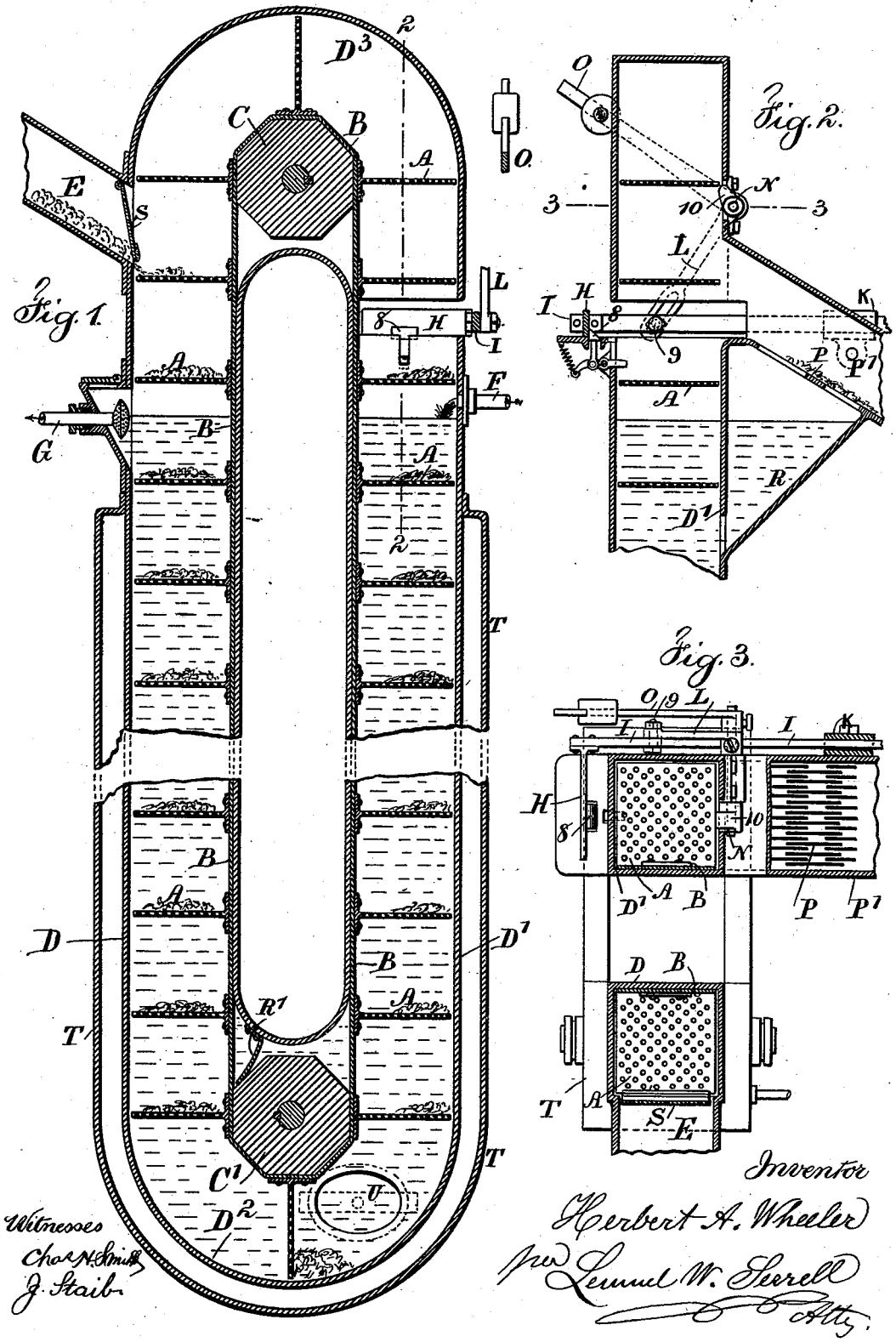

HERBERT A. WHEELER, OF ST. LOUIS, MISSOURI.

APPARATUS FOR MAKING EXTRACTS.

SPECIFICATION forming part of Letters Patent No. 550,033, dated November 19, 1895.

Application filed January 9, 1895. Serial No. 534,341. (No model.)

*To all whom it may concern:*

Be it known that I, HERBERT A. WHEELER, a citizen of the United States, residing at St. Louis, State of Missouri, have invented an Improvement in Apparatus for Extracting Substances by Infusion or Decoction, of which the following is a specification.

This apparatus is especially intended for extracting dyes, coloring-matter, and other materials from wood, and also for extracting fatty materials, and the improvement is available when a cold steeping operation is required or when the materials have to be boiled or treated at a high temperature.
I make use of a conveyer in a case, the materials to be treated being carried down by the conveyer at one side of the case and brought up by the conveyer at the other side of the case and discharged from such conveyer, and the liquid employed in making the extract is advantageously supplied near the place where the materials are finally delivered, and the extract passes away near where the fresh materials are supplied, so that the solid materials that are carried away are exposed to a washing action in comparatively-clear liquid solvent previous to their delivery, thus removing the soluble materials, as far as possible, previous to the delivery of the solid substances acted upon, and discharging the extract near where the solid materials are received and where they contain the largest amount of material to be taken up in solution.

In the drawings, Figure 1 is a vertical section of my apparatus. Fig. 2 is a partial section at right angles to Fig. 1 and on the line 2 2, and Fig. 3 is a sectional plan near the line 3 3.

The conveyer is made with shelves or trays A, that are joined up in endless series by a belt B of any suitable character. Usually this belt will be of links, similar to a chain, so as to hold the shelves or trays A horizontal or nearly so as they pass down and as they are brought up, and the belt passes around the wheels or drums C C', and to one of these drums power is applied for rotating the same and giving movement to the belt and the trays carried by it. The trays are preferably of open work or perforated.

The descending and ascending sides of the endless belt are incased, the portion of the case D at one side being connected to the portion D' at the other side by the semicircular portion $D^2$ of the case, so that the shelves or trays can be carried bodily down the portion D of the case and through the semicircular portion $D^2$ of such case and brought up through the part D' of the case, and the upper part of the belt may be open; but I have shown the case as continued to inclose the belt and trays at the upper part, as illustrated at $D^3$.

The materials to be acted upon are supplied into a feed-chute E in any suitable and regular manner, advantageously by lift-buckets that discharge the required amounts periodically, so that the materials slide down the feed-chute and fall upon one of the trays A that is immediately adjacent to the lower end of such feed-chute, and I have represented at F a pipe for supplying water, alcohol, or any other liquid made use of in extracting the coloring-matter or other material from the substances supplied by the feed-chute upon the shelves or trays, and at G is a pipe through which the extract is conveyed to any suitable receptacle.

It will now be understood that as the materials are fed through the chute E the belt B is moved by rotating one of the drums or wheels C or C', so that the shelves or trays A upon the receiving side are carried down through the liquid, which fills the lower portion of the case, and the materials upon the shelves drop off by gravity as the shelves swing around through the curved lower portion of the case, and that which is dropped by one tray is picked up and taken by the next tray, so as to be raised up in the ascending side D' of the case to the place of delivery, and in this movement the materials that are first supplied pass through the extracting liquid shortly before it passes away by the pipe G, and the materials which have given out their coloring-matter or other extract into the liquid are exposed to the fresh supply running in through the pipe F. Hence the extract is made as strong as possible and the operations are continuous and there is little or no waste in the operation.

As the refuse material from which the coloring-matter or other substances have been extracted is brought up to the surface of the extracting liquid, such liquid may be allowed to drain away to a greater or less extent by carrying the belt up a sufficient distance above the level of the liquid in the case, and such materials may be removed from the shelves or trays in any desired manner, such as by hand, a hoe or other scraper being made use of. I have, however, represented a device by which the refuse materials can be removed automatically.

The scraper H is guided by a handle or slide I, passing through the pivoted supports K, and having a stud or pin 9, passing into a slot in a lever-arm L, fastened to a rock-shaft N, supported in suitable bearings upon the case, and upon this rock-shaft is a weighted lever O, and any suitable latch is provided, such as the latch shown at 8, that holds the scraper H back out of the way, and as the tray or shelf A comes up it moves the latch 8 and allows the weighted lever O to turn the rock-shaft N and by the lever L move the scraper H and its slide-handle bodily, so that the scraper carries the material from off the tray to the discharge spout or incline P. As the tray passes up, it comes in contact with a cam or arm 10 upon the rock-shaft, which turns such rock-shaft back and by the slotted lever-arm L moves the scraper back bodily to the place of beginning, and in so doing the end of the latch 8 is depressed and it springs up and holds the scraper in position until the next tray comes along and moves the latch, and the operations are repeated.

It is advantageous to make the incline P of a plate with perforations in the same to allow liquid materials to drain through the same and return into the case by the incline or hopper bottom R, below such perforated incline P.

In some instances it is advantageous to apply an exhaust-fan to draw away from the case any vapors, and with this object in view the discharge-pipe P' may be extended to such fan or exhaust device, and to lessen the amount of air passing into the case a weighted curtain or flap may be provided at S, where the materials pass into the apparatus through the supply-pipe E, such curtain hanging down at the end of the pipe and yielding to the materials as they slide down the incline of the supply-pipe.

It is to be understood that the solvent made use of may be naphtha, benzene, carbon-bisulphide, or any other suitable material, according to the character of the substance acted upon, and where heat is required in making the solution there may be a jacket to the case into which steam is admitted, as shown at T, or where the infusion or decoction is treated to the best advantage when cold water or refrigerating liquid may be caused to circulate through the jacket.

According to the speed of movement of the endless conveyer, the material acted upon will be detained a longer or shorter time in the solution, and by this means the apparatus may be run at its full capacity without making any other change than that of the speed.

It will be apparent that a spring may be employed to give motion to the rock-shaft N in place of the weight, and it is generally advantageous to provide a door or hand-hole and cover at the lower part of the case, as shown at U, to give access for removing any obstruction.

In cases where the material acted upon is of the same gravity, or nearly so, as the solvent liquid the materials may not remain upon the trays; but such trays, being perforated or of open work, will cause such solid materials to be carried gradually through the liquid and finally lifted out at the place of delivery.

The comparatively-slow speed at which this conveyer moves renders it easy to apply a scraper automatically actuated in removing the material from the trays.

If desired, a hanging flap or valve may be applied at R' to prevent the liquid passing above the lower drum.

I do not claim an apparatus in which a conveyer carries the material in the opposite direction to the solvent In my improvement the conveyer takes the material down through the solvent and it slides off one shelf and is agitated and taken up by the following shelves in the conveyer, so as to insure a thorough action of the solvent on the material and to deliver the material at about the same level as it is received.

I claim as my invention—

1. The combination with an endless conveyer having projecting shelves or trays, of the supporting wheels or pulleys around which the endless conveyer passes, and two vertical trunks connected at the bottom by a semi-circular inclosure forming a case for the endless conveyers, a feed chute for supplying the solid materials at one side of the case, and a discharge pipe for the liquid extract at the same side of the case and below the feed chute, means for discharging the solid materials at the other side of the case, and a pipe for supplying the liquid into the case adjacent to but below the delivery mechanism for the solid material, substantially as set forth.

2. The combination with an endless conveyer having projecting shelves or trays, of the supporting wheels or pulleys around which the endless conveyer passes, and two vertical trunks connected at the bottom by a semi-circular inclosure forming a case for the endless conveyers, a feed chute for supplying the solid materials at one side of the case, and a discharge pipe for the liquid extract at the same side of the case and below the feed chute, means for discharging the solid materials at the other side of the case, and a pipe for supplying the liquid into the case adjacent to but below the delivery mechanism for the solid material, and a jacket surrounding the case for regulating the temperature of the extracting apparatus, substantially as set forth.

3. The combination with a conveyer having shelves or trays in endless series and wheels or drums around which such conveyer passes, of a case inclosing the bottom of the descending and ascending portions of such conveyer, supply and discharge pipes for the liquid passing into and from such case, a feed chute for supplying the solid materials acted upon, a scraper and guide handle, a rock shaft and lever arm connected with the scraper, a weight for moving the rock shaft, and a latch for holding the scraper in position, and a cam or arm acted upon by the endless conveyer for returning the scraper to its normal position, substantially as set forth.

Signed by me this 7th day of January, 1895.

HERBERT A. WHEELER.

Witnesses:
WILLIAM G. MOTT,
S. T. HAVILAND.